Dec. 12, 1933. G. H. CLAMER 1,939,623
ELECTRIC INDUCTION FURNACE AND METHOD OF OPERATING IT
Filed Feb. 20, 1929
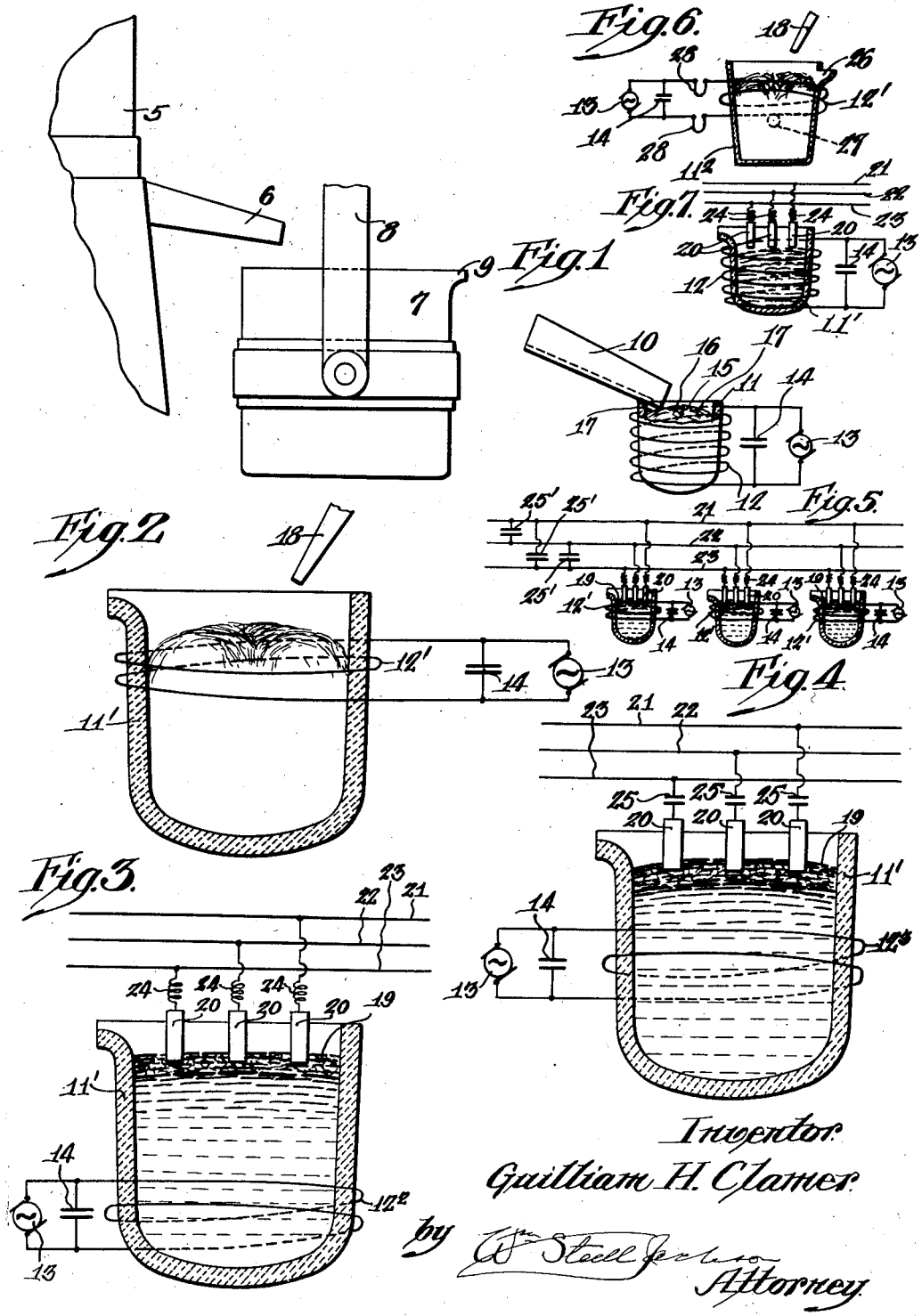
Inventor
Guilliam H. Clamer
by
Attorney Patented Dec. 12, 1933

1,939,623

UNITED STATES PATENT OFFICE 1,939,623

ELECTRIC INDUCTION FURNACE AND METHOD OF OPERATING IT

Guilliam H. Clamer, Atlantic City, N. J., assignor to Ajax Electrothermic Corporation, Ajax Park, N. J., a corporation of New Jersey Application February 20, 1929. Serial No. 341,291

5 Claims. (Cl. 13—26)

My invention relates to methods of operation of electric furnaces of the type in which an inductor coil surrounds a molten charge.

The main purpose of my invention is to stir the molten metal fully without adding much heat to the metal.

A further purpose is to obtain a stirring effect sufficient for thorough mixing or for increasing rapidity of reactions with slags or gases while adding but little to the heat of an already molten charge by means of a current at normal line frequency or a frequency but little above it.

A further purpose is to provide a tool, as it were, for use in the treatment of metals already melted, whereby the desired mixing for the addition of treating or alloying ingredients or for increasing the rapidity of reactions of molten metal with slags or gases, may be obtained with very little absorption of electrical energy.

A further purpose is to apply what heating and stirring current is used close to a treating slag, which may be separately heated or not as desired, in order that a current having low heating effect will have a maximum effect upon the reaction with the slag.

A further purpose is to apply current about the particular belt of a pool in which it is desired to concentrate the mixing in order to increase the rapidity of mixing of alloyed materials or of reaction of the metal with slags or gases.

A further purpose is to produce by the stirring action a sufficient crowning or elevation of the molten pool so that the central region of the surface of the pool will be free from slag or other covering, or surface films, the slag or oxidation products accumulating in a ring at the circumference of the surface.

In the slagging of a previously melted pool, a further purpose is to increase the speed of reaction by heating the slag without any considerable stirring and to stir the metal vertically preferably without any considerable heating.

A further purpose is to artificially heat a slag to increase its rate of reaction with a molten metal upon which it is floated, and at the same time stir the metal vertically throughout its mass with minimum metal heating to secure a maximum of reaction effect for the energy utilized.

A further purpose is to provide for removal of oxidation products from a furnace in which a pool of molten metal is being stirred to crown the metal at the middle, and to thus keep the crowned part of the metal clear for treatment.

A further purpose is to make use of the crowning of the molten pool, and more particularly of the circumferential surrounding depressed ring, to collect the oxidation products about the outer limits of the pool and to remove these oxidation products at intervals in any suitable manner such as by tilting the furnace and pouring them off through a side opening or spout.

A further purpose is to intensify the effect of slag treatment upon the surface of molten metal by heating the slag, or the molten metal locally or by heating both and at the same time bodily circulating the molten metal upwardly at the middle and then outwardly to give a maximum intensity and distribution of contact between the molten metal and the slag. This I believe to be new even where the inductive energy input is not kept low to avoid unnecessary inductive heat development within the metal.

A further purpose is to improve the effect of slag upon the surface of a molten metal pool by flow of current through the slag and to maintain uniformity of current flow by increasing the impedance of the circuit far beyond that due to the resistance of the circuit so as to render the current flow largely independent of the resistance.

A further purpose is to include inductance in a series with current supply for submerged arc heating of a slag in order to secure volume and uniformity of current flow through the slag, without much regard to the resistance of the circuit.

A further purpose is to apply arc heating at the surface of a furnace pool and concurrently thoroughly circulate the metal, upwardly at the approximate center of the pool with return toward the perimeter so as to effect a maximum rate of exposure of new surfaces of metal to the heating arcs.

Further purposes will appear in the specification and in the claims.

I have illustrated the application of my invention by a few forms only, selecting the forms with a view to the best illustration of the method involved.

Figures 1 to 7 are diagrammatic views showing apparatus in side elevation partly sectioned in Figure 1 and largely in section in Figures 2-7, with diagrammatic winding in all the figures, illustrating apparatus by which my invention may be carried out.

In the drawing similar numerals indicate like parts.

Molten metal has been treated by the addition of alloying material or by other means while the metal is being heated and stirred by high frequency current passing through a surrounding coil. So far as I am aware it has always been the intention to heat the metal during this treatment rather than to stir it and whatever stirring took place was incidental to the use of the heating current rather than the main purpose.

It is my intention to use induced electric current to stir the metal during treatment rather than to heat it and to use the lower range of frequencies rather than high frequency. Most desirably I use commercial frequencies.

Melting of the metal preliminary to its treatment can be effected in large quantities by fuel furnaces or by arc furnaces, for example, to great advantage by reason of the bulk handled, but when the metal is to be treated with slag or air blast or by addition of alloying or chemically treating ingredients, it is usually desirable to treat the metal in smaller pools.

As my invention relates to a treating operation rather than a heating operation I have assumed that the metal would be melted elsewhere. For this purpose I have shown in Figure 1 a fuel furnace 5 from which the molten metal is poured through a spout 6 into a container which is shown in Figure 1 to be a ladle 7 suspended by bail 8 and having a spout 9.

The container 7 may be a mere intermediate holder from which the metal may be poured through trough 10 into an electric furnace crucible 11, or the container 7, whether called a ladle or a crucible, may in fact be the crucible of an electric furnace. In other words the crucibles 11' of Figures 2-5, or $11^2$ of Figure 6, for example, may receive their charges directly from the melting furnace.

The furnace crucible, or other container, is surrounded in Figure 1 by a coil 12 supplied with alternating current from a suitable source 13. Power factor correction may be provided by condenser means indicated at 14. The molten metal charge 15 may be covered by a slag 16, if slagging treatment be intended as in Figure 1, or may be free from slag where its surface is intended to be subjected to air or gas blast as in Figures 2 and 6.

It is my intent to apply my method and apparatus for the purpose of stirring effectively at small power input while heating by an arc, for example or while subjecting the metal to treating or alloying processes which may be desired. The metal may be sufficiently heated by the chemical combinations taking place within it, or, for a mere alloying process, may be superheated sufficiently before it is supplied to the electric furnace so that proper mixing will take place with little or no outside heating.

Whatever the intention as to the operation to be performed, thorough stirring is necessary, but the heating effect is not required for many operations and any considerable heating would be wastefully applied. I supply the stirring function by induction with a minimum of inductive heating, obtaining the benefits of the mechanical mixing or chemical treating or alloying operations under the best advantage of thorough or localized stirring with a minimum of energy input.

Though the heating effect upon a charge within an inductor coil carrying alternating current is dependent upon and is very nearly proportional to the frequency as well as to the square of the ampere turns the stirring effect upon the charge of the alternating current passing through such an inductor is largely independent of the frequency and is dependent upon the square of the ampere turns. It is the purpose herein, therefore, to utilize a relatively low frequency, preferably a commercial frequency, and to reduce the ampere turns below the number necessary for efficient heating for an otherwise normal electric furnace. Sufficient stirring for the purpose is thus secured without using much of the heating effect of the current.

Since the number of ampere turns to be secured is small it is permissible, as compared with a normal high frequency furnace, to reduce the number of turns or the amperage or both.

In Figures 1 and 7 the inductor turns diagrammatically illustrated cover substantially the entire vertical height of the charge in the crucible with the result that the amperage used would be relatively quite small. In the other figures the inductor is of shorter range and the amperage used to produce the same stirring effect would be relatively larger.

In Figure 1 the circulation obtained would be along chiefly vertical lines up the center, breaking at the top, flowing outwardly to the perimeter and returning along the outside 17, giving a rapid slagging action without the addition of much heat and with an economy of energy not otherwise attainable. Some little heat will, of course, be supplied by the electrical energy and this heat is added to whatever heat may be developed by the chemical reaction from the slagging.

Where the inductor coil covers substantially the entire vertical height of the charge stirring takes place throughout substantially the entire charge depth, but where the inductor coil is short, as compared with the depth of the charge, the stirring will be less uniform and will be greatest in the belt most directly served by the coil. It will always be upward at or near the center of the top of the pool.

Where it is desired to act upon the molten metal by an air blast, heated or otherwise, as through nozzle 18 the heat supplied by oxidation will be quite sufficient to maintain the temperature of the bath. To this heat will be added the low amount of heat available from the electric energy. Whether the necessary heat be supplied by superheating the metal initially or by chemical action during the stirring operation, it is desirable that the bath shall not primarily be dependent upon heat supplied by the electric energy.

The circulation upwardly at the middle and outwardly along the outer parts of the furnace pool results in a crowning of the molten metal of the pool at the center with a resultant falling off of the height of the metal toward the circumference of the upper surface of the pool. The extent of this crowning can be altered considerably by the location of the inductor coil and by the amount of stirring energy provided within it.

For use of an air blast it is desirable to crown the metal considerably so that any impurity or slag on the surface may lie about the lower (outer) circumference, leaving the central (higher) surface clean and bright to react to the best advantage with the oxygen of the air. Crowning of the metal can be controlled by the location of the coil keeping in mind that within reasonable limits raising the coil increases the stirring activity at the top of the furnace but reduces the depth to which the stirring is effective. The most complete stirring is secured by distributing the current over the entire depth of the pool.

In Figure 3 the coil $12^2$ is located at the bottom to secure maximum stirring of the bottom and body of the metal with minimum crowning. In Figure 4 the coil $12^3$ is at the center.

Figures 3, 4 and 5 show furnaces in which treatment with slag is effected and in Figure 5 of which the coils 12' have been shown as surrounding approximately the top of the molten metal in the several baths. In each the slag 19 is heated by electric current passing into the slag by electrodes 20 through which electric current is transmitted to the slag. In each the electric current is supplied from a multiphase source, shown as three-phase current supply lines 21, 22 and 23, though obviously the question of single or multiphase supply and the number of phases, where multiphase supply is used, is a matter of determination by the designer.

In order that a large current may be provided and that the current through the electrodes may be largely independent of the resistance met I provide inductances or capacities in series with the electrodes, and suitably compensate for the inductances or capacities at other points in the circuits. In Figure 3 inductances 24 are shown, whereas in Figure 4 capacities 25 are used. In either case it is desirable to operate a number of furnaces from the same supply lines such as 21, 22 and 23 in Figure 5 and to compensate for all of the inductance or capacity by capacities or inductances, such as capacities 25', (Figure 5) which affect all of the furnace circuits.

The current through electrodes 20 offers a benefit supplemental to the stirring feature of my invention and cooperating with the stirring function in that heating of the slag intensifies the reactions of the metal with the slag.

It may be desirable to heat the slag whatever the location of the coil. Whether the coil cover substantially the entire depth of the pool, or be located near the top, at an intermediate point or near the bottom, will depend upon the intended use of the coil in the combination formed. Where maximum stirring activity at the top is sought this can be secured by locating the coil at or about the top of the pool. This has some advantage also in that whatever heating effect is available from the current in the coil heats the molten metal close to the slag, further intensifying the slagging reaction. However, when more thorough circulation of the entire pool is desired, or when it is desired to intensify the circulation at the bottom, the coil will be centered about an intermediate portion of the pool as in Figure 1, 4 and 7 or about the lower portion of the pool as in Figure 3.

The inductances 24 in Figures 3 and 7 and the capacities 25 in Figure 4 should be compensated for the same purpose as the compensation by condensers in Figure 5 to tune or approximately tune the circuits, and to reduce the variation of the currents with variation in the resistance of the circuits so that the slag may be more uniformly and more reliably heated than would otherwise be the case.

In Figure 6 air or gas treatment is contemplated through nozzle 18 and it is desirable as in Figure 2 to have the crowned surface as bright and clean as possible. By reason not only of the greater height at the center given by the crowning but also because of the movement of the metal from the top center over toward the sides, any slag products formed which might cover the surface are carried over to the circumference of the pool. The crucible 11² of this Figure 6 is shown as provided with a spout 26 and is mounted upon trunnions 27 in order that the oxidation products may be scraped or poured out through the spout when the crucible has been slightly tilted. Any suitable provision such as the slack 28 may be used to permit movement of the crucible without interference with the electrical connections of the coil.

In Figure 7 I have taken advantage of the efficient heating by arcs at the surface in connection with efficient stirring by a pool-surrounding inductor having low heating effect to secure a maximum interchange of heat from the arcs with new bodies of molten metal.

The crucible 11' is surrounded by a coil which may be of any desired type and which for convenience has been shown as corresponding with coil 12 in Figure 1.

The metal is heated at the surface by electric arcs whose electrodes 20 may be placed above the surface as in Figure 7, or may be submerged within a slag upon the surface if desired. The arcs may be fed from a multiphase supply circuit as indicated in other figures or may be fed by single phase as preferred, just as is true of the other figures. The circuits may be tuned if desired as in Figure 5.

The high heating efficiency of the arc furnace is much improved by the rapid change of the metal effected at little energy cost by the stirring coil. In this as in all of the other forms, if arc heating be applied the arc and inductor coil can be supplied from the same current source if desired.

The methods and constructions illustrated permit great flexibility of handling of the molten metal for treating purposes without waste of heat through unnecessary inductive heat function and make it possible to heat the metal or to treat it by any of the recognized processes of air or gas blast, slagging or added treating materials to great advantage.

Where reference is made herein to low frequency or relatively low frequency for that part of my invention dealing with stirring without much heating it is not intended that the frequency must in any event be below normal line frequencies but merely that the frequency lie in the lower range of frequencies where the stirring effect is predominant as compared with the heating effect. Because of its availability, cheapness and general suitability normal line frequency is preferred but the purpose would still be served by frequencies below or above normal line frequency provided the frequency be not so high as to heat rather than to stir.

Having thus described my invention, what I claim as new and desire to secure by Letters Patent is:—

1. The method of slagging a molten metal pool by a slag reacting with the metal with a maximum of slagging effect and a minimum of heating which consists in electro-magnetically stirring the molten metal upwardly at the center with outward flow from the center at the surface inductively by inducing within the outer part of the pool a current having high stirring effect and low heating effect and concentrating the induced current close to the surface so as to supply the heating effect largely at the surface to increase the intensity of slagging action.

2. The method of slagging a molten metal pool by a slag reacting with the metal with a maximum of slagging effect and a minimum of heating, which consists in electro-magnetically stirring the molten metal upwardly at the center with outward flow from the center at the surface inductively by inducing within the outer part of the pool a current having high stirring effect and low heating effect, concentrating the current at the surface so as to supply the heating effect largely at the surface to increase the intensity of slagging action and heating the slag electrically from above the surface of the metal to further increase the intensity of the reaction.

3. The method of controlling the stirring effect of an inductor upon a molten mass within the inductor which consists in utilizing an inductor covering a part only of the height of the pool and in placing the inductor about that part of the height of the pool where it is desired that the stirring shall be most pronounced.

4. In an electric furnace, a container holding a charge and a treating slag upon the surface of the charge, an inductor coil surrounding the container at the upper part of the charge, a source of current supply for said coil of commercial frequency and low current value so as to be low in heating effect and high in stirring effect, and electric arc means for heating the slag.

5. An electric furnace or ladle crucible holding a charge and a treating slag upon the surface of the charge, means for selectively stirring a belt of the charge in said crucible at whatever height desired to vary the stirring effect according to the relative height of the belt stirred, and means above the charge for heating the slag upon the charge to increase its metallurgical activity and to give maximum slagging effect for whatever stirring movement is given the metal of the charge.

GUILLIAM H. CLAMER.